United States Patent
Talley et al.

(10) Patent No.: US 8,208,933 B1
(45) Date of Patent: Jun. 26, 2012

(54) IMPLEMENTING GLOBAL NEIGHBOR LISTS TO SUPPORT LOW-COST INTERNET BASE STATIONS (LCIBS)

(75) Inventors: Ryan S. Talley, Overland Park, KS (US); Bryan T. Barbee, Olathe, KS (US); Timothy W. Sill, Platte City, MO (US); Christopher M. Yenney, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 842 days.

(21) Appl. No.: 12/190,547

(22) Filed: Aug. 12, 2008

(51) Int. Cl. *H04W 4/00* (2009.01)
(52) U.S. Cl. ......... 455/446; 370/328
(58) Field of Classification Search .......... 455/561, 455/560, 435, 436, 444; 370/328, 332, 331
See application file for complete search history.

(56) References Cited

U.S. PATENT DOCUMENTS

| 7,065,361 | B1 | 6/2006 | Fortuna |
| 7,145,890 | B1* | 12/2006 | Seo et al. ............ 370/331 |
| 2004/0204097 | A1 | 10/2004 | Scheinert et al. |
| 2005/0148368 | A1* | 7/2005 | Scheinert et al. ........ 455/561 |
| 2007/0099561 | A1* | 5/2007 | Voss ............ 455/12.1 |
| 2011/0223935 | A1* | 9/2011 | Alfano et al. ........ 455/456.1 |

* cited by examiner

*Primary Examiner* — George Eng
*Assistant Examiner* — Nizar Sivji

(57) ABSTRACT

Methods and systems are provided for implementing global neighbor lists to support low-cost Internet base stations (LCIBs). In a macro wireless-communication network, each sector has a neighbor list that contains the pseudorandom number (PN) offsets of surrounding sectors. To account for LCIBs, a global neighbor list, configurable across sectors, access networks, markets, and/or vendors, is introduced. The global list may be maintained on an access network or on a separate server that interfaces with access networks. The global list may be incorporated at the beginning, in the middle (i.e. at specific priority levels), or at the end of each respective sector's neighbor list. If a given sector's neighbor list is full, it could be left unmodified, or some global-list entries could displace some existing entries. Other than incorporating entries from the global list, each macro sector's neighbor list remains, for the most part, independently modifiable.

19 Claims, 3 Drawing Sheets

IMPLEMENTING GLOBAL NEIGHBOR LISTS TO SUPPORT LOW-COST INTERNET BASE STATIONS (LCIBS)

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station operating on a given sector/carrier to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (e.g. CDMA and EV-DO) are supported), and also transmit what is known as a pilot beacon, which includes administrative messages and parameters that mobile stations use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for implementing global neighbor lists to support LCIBs. In one aspect, an exemplary embodiment may take the form of a method comprising identifying a grouping of macro-network coverage areas, each macro-network coverage area having an associated neighbor list; maintaining a first list of PN offsets reserved for use by LCIBs having coverage areas overlapping at least one of the macro-network coverage areas in the grouping; and populating the neighbor lists of the macro-network coverage areas in the grouping with the first list of PN offsets. In another aspect, an exemplary embodiment may take the form of a neighbor-list server programmed to carry out the above-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
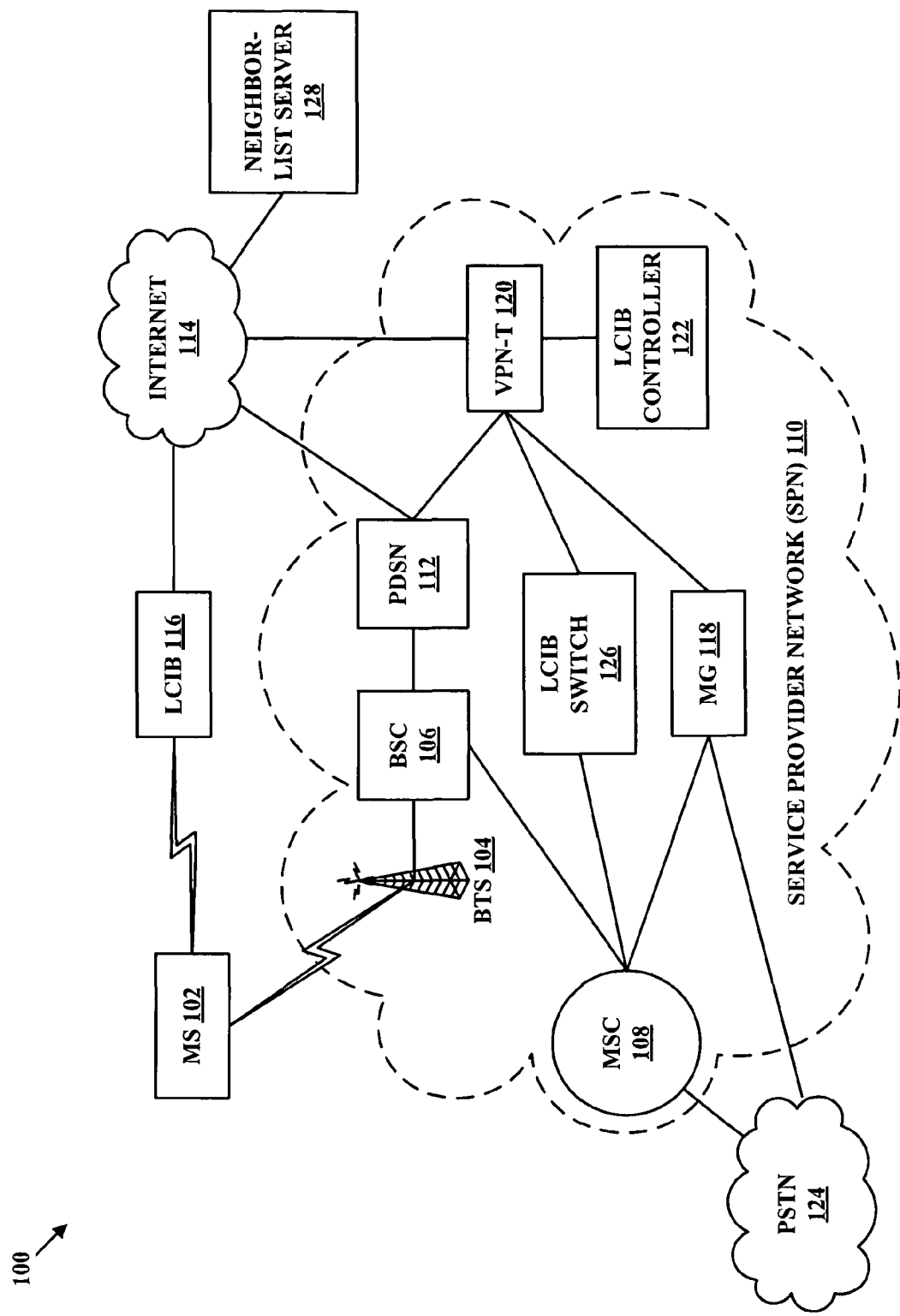
FIG. 1 depicts a communication system, in accordance with exemplary embodiments.

From time to time, a mobile station that is in communication with a given macro-network sector may cooperate with the network to perform a "handoff," by which the mobile station switches to communicating with a neighboring macro-network sector. To inform mobile stations as to their handoff options, macro base stations typically broadcast a "neighbor list," which may include pseudorandom-number (PN) offsets in use by neighboring sectors. In general, a PN offset is a numerical code that base stations use to encode—and mobile stations use to decode—information transmitted over an air interface. Typically, it is by PN offset that mobile stations distinguish among base stations, or among various sectors of a given base station.

Thus, in a typical CDMA network, each macro-network sector (i.e. the hardware and software of a given macro base station responsible for providing service in the sector) has an associated neighbor list, which the macro base station broadcasts in the sector. Each such neighbor list contains the PN offsets of all of the surrounding macro-network (target) sectors that could possibility receive a handoff from that (source) sector.

With the introduction of numerous LCIBs—whose respective coverage areas very frequently—in fact almost universally—overlap that of one or more macro-network sectors, it is helpful and perhaps even necessary to populate the neighbor lists of sectors across a market area, across an access network, or across some other grouping of sectors with certain PN offsets that are used by LCIBs in the chosen grouping of macro-network sectors. This addition of LCIB-associated PN offsets ("LCIB PNs") to macro-network-sector neighbor lists aids mobile stations in making idle handoffs from macro-network sectors to LCIBs. In current implementations, any addition of one or more LCIB PNs to one or more macro-network-sector neighbor lists must be done manually on a sector-by-sector basis.

In accordance with the invention, a global list of LCIB PNs is maintained for a grouping of two or more macro-network sectors. This grouping could be a grouping of multiple sectors on the same access network, a grouping of multiple sectors across multiple access networks, a grouping of multiple sectors in a given market area, a grouping of multiple sectors across multiple market areas, a grouping of sectors made by a given base-station vendor, a grouping of sectors across multiple base-station vendors, any combination of the foregoing, or any other grouping of multiple macro-network sectors deemed suitable for a given implementation.

Whatever the chosen grouping, the global list of LCIB PNs may include one or more LCIB PNs that are respectively used by one or more LCIBs whose coverage areas overlap that of the one or more macro-network sectors in the grouping. The global list may be maintained on a network server to which all of the macro-network sectors in the grouping have access (and/or which has access to all of the macro-network sectors in the grouping), whatever the grouping may be. In some embodiments, the global list may be maintained on a given access network, which may make sense, in the case of the grouping being coextensive with that access network.

Once the global list has been compiled (and note that it may well be updated from time to time), the LCIB PNs in the global list are populated to the neighbor lists of the macro-network sectors in the grouping. The LCIB PNs could be added to the top, middle, or bottom of any or all of the neighbor lists. That is, the LCIB PNs could be prepended or appended to any or all of the neighbor lists, or they could be inserted somewhere in the middle (i.e. at a specified priority). Note that, in general, neighbor lists are ordered, such that higher-priority entries are considered to be at the "top" of the list, while lower-priority entries are considered to be at the "bottom" of the list. In the event that a given sector's neighbor list is already fully populated, that sector's neighbor list could be left unmodified, or one or more existing entries could be displaced in favor of an equal number of LCIB PNs. And many other variations are possible as well.

In general, anywhere between no control and total control could be given to each sector (or to each macro base station) as to how many and/or in what position LCIB PNs will be accepted into macro-network-sector neighbor lists. On the no-control end, a central entity (e.g. the above-mentioned server) could dictate to any macro-network sector how many LCIB PNs to accept into the sector's neighbor list, and in what position (i.e. priority) on the list. On the total-control end, each sector (or each base station) could have a particular profile that controls how many LCIB PNs will be accepted and/or in what position. And any option in between these extremes may be implemented as well, without departing from the invention.

The LCIB PNs may be conveyed to macro-network base stations in any form (text file, spreadsheet, database file, etc.) and communicated according to any protocol (HTML, SIP, etc.). Upon receipt, the sectors/base stations may add one or more LCIB PNs to their respective neighbor lists in accordance with instructions to do so and/or the sectors' and/or base stations' own profiles (i.e. preferences). The macro-network sectors then broadcast their neighbor lists per their usual behavior, where those neighbor lists now include one or more LCIB PNs.

Note that the coverage area of a typical LCIB is much smaller than a typical sector, and thus multiple LCIBs across a grouping of sectors may use the same PN offset (i.e. LCIB PNs are reused according to a reuse algorithm). As such, there are typically not so many unique LCIB PNs in a grouping of sectors grouped along market, access-network, and/or vendor lines so as to render population of a global list of LCIB PNs into macro-sector neighbor lists impractical. Note that global as used herein does not necessarily mean worldwide, but rather that the list of LCIB PNs is global to the grouping of macro-network sectors.

And it should be noted that the above overview is illustrative and not limiting. That is, additional and/or different features may be present in some embodiments of the present invention. It should be noted as well that any description of an LCIB and/or a macro network providing service according to CDMA 1xRTT is by way of example, and that any suitable modes (e.g. protocols) may be used instead, such as EV-DO, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, an LCIB switch 126, and a neighbor-list-server 128. And additional entities could be present as well, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 118, LCIB switch 126, and PSTN 124. In general, MSC 108 acts as a switch between (a) PSTN 124 and (b)(i) one or more BSCs such as BSC 106 and (ii) one or more LCIB switches such as LCIB switch 126, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and LCIBs.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include (a) a wireless interface for communicating with (i) one or more mobile stations according to a protocol such as CDMA (and/or one or more other technologies) and (ii) one or more stationary transceivers according to a wireless-communication mode such as simple RF (and/or one or more other technologies), as well as (b) an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least MG 118, LCIB controller 122, LCIB switch 126, and Internet 114. In general, VPN terminator 120 functions to establish secure VPN connections over Internet 114 with LCIBs such as LCIB 116, enabling the LCIBs to securely communicate with devices on SPN 110 and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on SPN 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

LCIB switch 126 may be any networking element arranged to carry out the LCIB-switch functions described herein. As such, LCIB switch 126 may include a communication interface, a processor, and data storage comprising instructions executable by the processor for carrying out those LCIB-switch functions. The communication interface may include one or more wired and/or wireless interfaces for communicating with at least MSC 108 and VPN terminator 120. In general, LCIB switch 126 acts as a switch between MSC 108 and VPN terminator 120, enabling mobile stations communicating via LCIBs to engage in calls over PSTN 124 via MSC 108.

Neighbor-list server 128 may be any networking element arranged to carry out the neighbor-list-server functions described herein. As such neighbor-list server 128 may include a communication interface, a processor, and data storage comprising instructions executable by the processor for carrying out those neighbor-list-server functions. The communication interface may include one or more wired and/or wireless interfaces for communicating with one or more entities—such as macro-network base stations (e.g. BTS 104, BSC 106)—over Internet 114. Note that neighbor-list server 128 may reside elsewhere without departing from the invention, such as on SPN 110, perhaps in communication with BSC 106 and/or PDSN 112. And many other arrangements are possible as well.

b. An Exemplary LCIB

Figure 2:
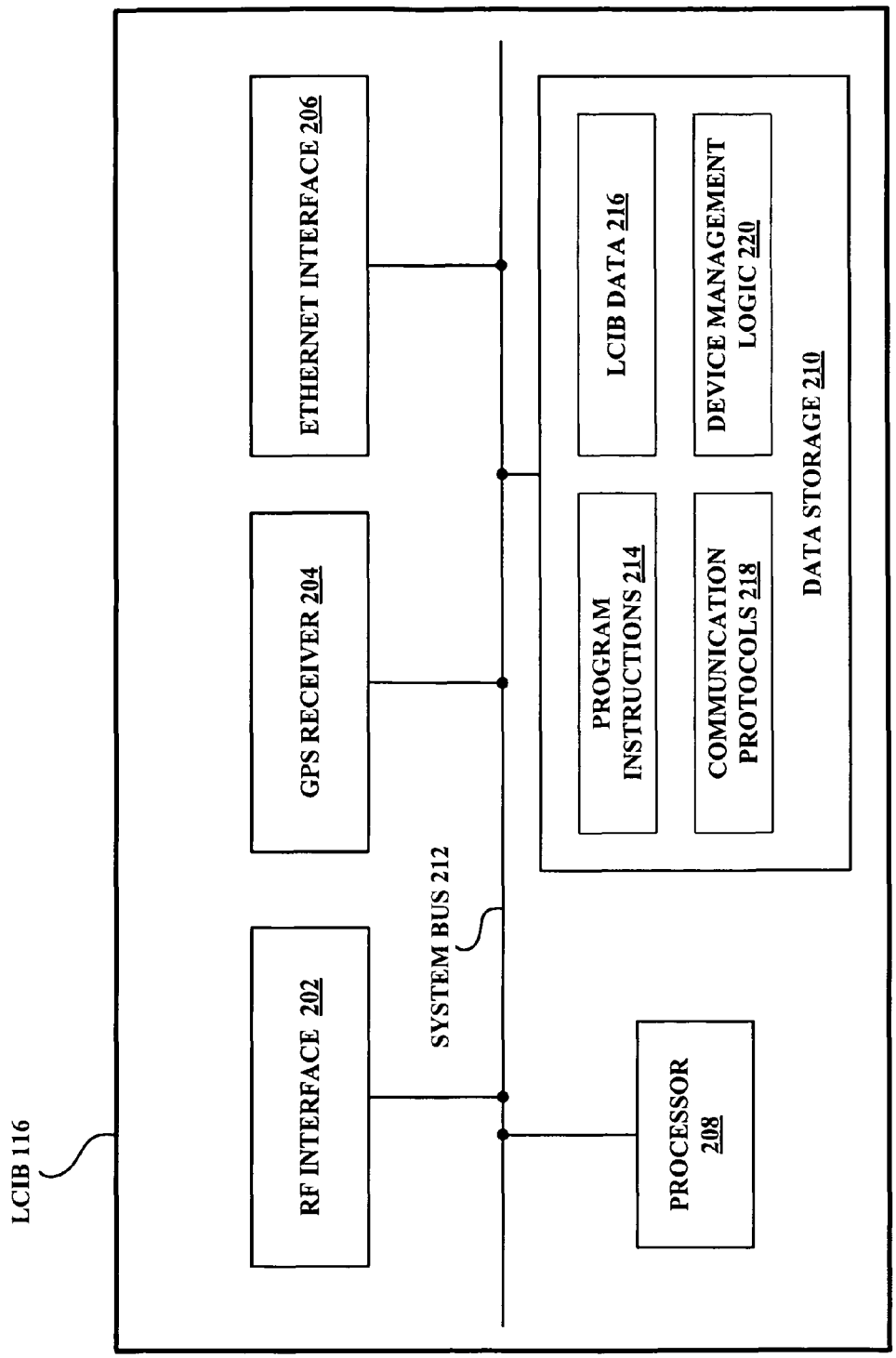
FIG. 2 depicts an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for (a) providing a wireless coverage area according to a wireless-communication protocol such as CDMA (and/or one or more other technologies) and (b) communicating with one or more stationary transceivers, as described herein. GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation

Figure 3:
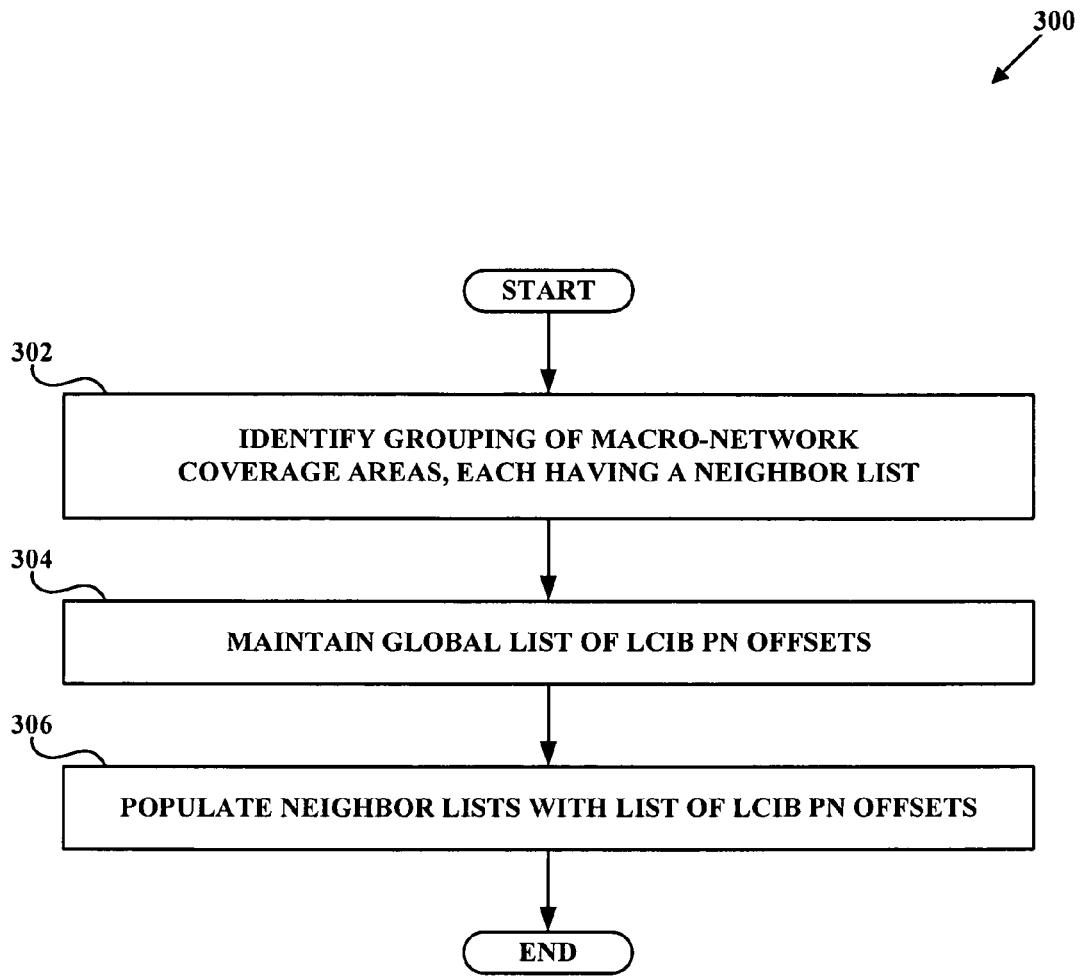
FIG. 3 depicts a flowchart of a method, in accordance with exemplary embodiments.

FIG. 3 depicts a flowchart of an exemplary method 300, in accordance with an exemplary embodiment. And although method 300 is described as being carried out by neighbor-list server 128, this is not required. In some embodiments, method 300 may be carried out by neighbor-list server 128 in cooperation with one or more other entities, such as BTS 104, BSC 106, etc. In general, method 300 could be carried out by any one or any combination of the network elements described herein, or any other network element(s).

As shown in FIG. 3, method 300 begins at step 302, when neighbor-list server 128 identifies a grouping of macro-network coverage areas, each macro-network coverage area having an associated neighbor list. Each macro-network coverage area could be a cell or sector, as examples. Furthermore, the macro-network coverage areas may operate (i.e. provide service to mobile stations) according to a CDMA (e.g. 1xRTT or EV-DO) protocol, and/or according to one or more other protocols now known or later developed.

The grouping of macro-network coverage area may (a) consist of all macro-network coverage areas associated with a given access network, (b) span multiple access networks, (c) consist of all macro-network coverage areas associated with a given market area, (d) span multiple market areas, (e) consist of all macro-network coverage areas associated with a given base-station vendor, or (f) span multiple base-station vendors. And any combination of these delineations may be used as the grouping as well, or some other delineation could be used.

At step 304, neighbor-list server 128 maintains a first list of PN offsets reserved for use by LCIBs having coverage areas overlapping at least one of the macro-network coverage areas in the grouping identified in step 302. This list may also be referred to herein as a "global" list of PN offsets, and the PN offsets on the list may be referred to herein as LCIB PNs. As described, this global list of LCIB PNs could be maintained by a network server residing on the Internet, by an entity residing on a given access network, or perhaps on some other entity.

At step 306, neighbor-list server 128 populates the neighbor lists of the macro-network coverage areas in the grouping with the first list of PN offsets. This step may involve neighbor-list server 128 transmitting the first list of PN offsets to each of the macro-network coverage areas (e.g. sectors) in the grouping. Step 306 may involve prepending at least one PN offset from the first list to at least one of the neighbor lists of the macro-network coverage areas, appending at least one PN offset from the first list to at least one neighbor list, and/or inserting at least one PN offset from the first list into at least one neighbor list. This step may further involve replacing at least one preexisting entry in at least one of the neighbor lists.

Furthermore, step 306 may involve populating a neighbor list of a given macro-network coverage area according to a profile for the given macro-network coverage area, wherein the profile indicates at least one of (a) how many PN offsets the given macro-network coverage area will accept into its neighbor list from the first list and (b) in what position in its neighbor list the given macro-network coverage area will accept one or more PN offsets from the first list. After the populating step has been carried out, a macro-network coverage area in the grouping may broadcast a modified neighbor list that includes at least one PN offset from the first list. In some examples, such a modified neighbor list includes all of the PN offsets from the first list.

4. Conclusion

Various exemplary embodiments have been described above. Those skilled in the art will understand, however, that changes and modifications may be made to those examples without departing from the scope of the claims.

What is claimed is:

1. A method comprising:
a neighbor-list server identifying a grouping of two or more macro-network coverage areas, each macro-network coverage area in the identified grouping having a respective associated neighbor list;
the neighbor-list server maintaining in data storage a global list of low-cost Internet base station (LCIB) pseudorandom number (PN) offsets, the global list of LCIB PN offsets being global to the identified grouping of macro-network coverage areas, the LCIB PN offsets in the global list being reserved for use by LCIBs having coverage areas overlapping at least one of the macro-network coverage areas in the identified grouping, wherein at least two such LCIBs use the same LCIB PN offset; and
the neighbor-list server populating the global list of LCIB PN offsets to the respective associated neighbor lists of the macro-network coverage areas in the identified grouping for broadcasting by those macro-network coverage areas of respective associated modified neighbor lists, wherein each such respective associated modified neighbor list includes at least one LCIB PN offset from the global list.

2. The method of claim 1, wherein each macro-network coverage area is a cell.

3. The method of claim 1, wherein each macro-network coverage area is a sector.

4. The method of claim 1, wherein the macro-network coverage areas operate according to a code division multiple access protocol.

5. The method of claim 1, wherein the grouping of macro-network coverage areas consists of all macro-network coverage areas associated with a given access network.

6. The method of claim 5, wherein the neighbor-list server resides on the given access network.

7. The method of claim 1, wherein the grouping of macro-network coverage areas spans multiple access networks.

8. The method of claim 1, wherein the grouping of macro-network coverage areas consists of all macro-network coverage areas associated with a given market area.

9. The method of claim 1, wherein the grouping of macro-network coverage areas spans multiple market areas.

10. The method of claim 1, wherein the grouping of macro-network coverage areas consists of all macro-network coverage areas associated with a given base-station vendor.

11. The method of claim 1, wherein the grouping of macro-network coverage areas spans multiple base-station vendors.

12. The method of claim 1, wherein populating the global list of LCIB PN offsets to the respective associated neighbor lists of the macro-network coverage areas in the identified grouping comprises transmitting the global list to each of the macro-network coverage areas in the identified grouping.

13. The method of claim 1, wherein populating the global list of LCIB PN offsets to the respective associated neighbor lists of the macro-network coverage areas in the identified grouping comprises prepending at least one LCIB PN offset from the global list to at least one such neighbor list.

14. The method of claim 1, wherein populating the global list of LCIB PN offsets to the respective associated neighbor lists of the macro-network coverage areas in the identified grouping comprises appending at least one LCIB PN offset from the global list to at least one such neighbor list.

15. The method of claim 1, wherein populating the global list of LCIB PN offsets to the respective associated neighbor lists of the macro-network coverage areas in the identified grouping comprises inserting at least one LCIB PN offset from the global list into at least one such neighbor list.

16. The method of claim 1, wherein populating the global list of LCIB PN offsets to the respective associated neighbor lists of the macro-network coverage areas in the identified grouping comprises replacing at least one preexisting entry in at least one such neighbor list.

17. The method of claim 1, wherein populating the global list of LCIB PN offsets to the respective associated neighbor lists of the macro-network coverage areas in the identified grouping comprises populating a neighbor list of a given macro-network coverage area according to a profile for the given macro-network coverage area, wherein the profile indicates at least one of (a) how many PN offsets the given macro-network coverage area will accept into its neighbor list from the global list and (b) in what position in its neighbor list the given macro-network coverage area will accept one or more PN offsets from the global list.

18. The method of claim 1, wherein at least one such respective associated modified neighbor list includes all of the LCIB PN offsets from the global list.

19. A neighbor-list server comprising:
a communication interface;
a processor; and
data storage comprising instructions executable by the processor for causing the neighbor-list server to carry out functions including:
the neighbor-list server identifying a grouping of two or more macro-network coverage areas, each macro-network coverage area in the identified grouping having a respective associated neighbor list;
the neighbor-list server maintaining in the data storage a global list of low-cost Internet base station (LCIB) pseudorandom number (PN) offsets, the global list of LCIB PN offsets being global to the identified grouping of macro-network coverage areas, the LCIB PN offsets in the global list being reserved for use by LCIBs having coverage areas overlapping at least one of the macro-network coverage areas in the identified grouping, wherein at least two such LCIBs use the same LCIB PN offset; and
the neighbor-list server populating the global list of LCIB PN offsets to the respective associated neighbor lists of the macro-network coverage areas in the identified grouping for broadcasting by those macro-network coverage areas of respective associated modified neighbor lists, wherein each such respective associated modified neighbor list includes at least one LCIB PN offset from the global list.

* * * * *